(12) United States Patent
Shovels (10) Patent No.: US 8,973,355 B2
(45) Date of Patent: Mar. 10, 2015

(54) MULTI-LAYER LIQUID-COOLED MOUNT

(71) Applicant: Tenneco Automotive Operating Company Inc., Lake Forest, IL (US)

(72) Inventor: Michael L. Shovels, Aurora, IL (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 103 days.

(21) Appl. No.: 13/833,850

(22) Filed: Mar. 15, 2013

(65) Prior Publication Data

US 2014/0260207 A1    Sep. 18, 2014

(51) Int. Cl.
  *F01N 5/02*    (2006.01)
  *F01N 3/00*    (2006.01)
  *F01N 3/10*    (2006.01)
  *F01N 3/20*    (2006.01)

(52) U.S. Cl.
  CPC ........... *F01N 3/2066* (2013.01); *F01N 2610/02* (2013.01); *F01N 2610/1453* (2013.01); *F01N 2610/11* (2013.01)
  USPC .................... 60/320; 60/295; 60/301; 60/303

(58) Field of Classification Search
  CPC ............ F01N 3/2066; F01N 2260/024; F01N 2610/02; F01N 2610/11; F01N 2610/1453
  USPC .............................. 60/295, 301, 393, 317, 320
  See application file for complete search history.

(56) References Cited

U.S. PATENT DOCUMENTS

| | | | |
|---|---|---|---|
| 6,192,677 B1 | 2/2001 | Tost | |
| 6,814,303 B2 | 11/2004 | Edgar et al. | |
| 7,168,241 B2 | 1/2007 | Rudelt et al. | |
| 7,497,075 B2 | 3/2009 | Ripper et al. | |
| 7,603,849 B2 | 10/2009 | Hanitzsch et al. | |
| 8,056,326 B2 | 11/2011 | Cox et al. | |
| 2007/0228191 A1* | 10/2007 | Harmon et al. | 239/533.2 |
| 2010/0132338 A1 | 6/2010 | Schmale et al. | |
| 2011/0030349 A1 | 2/2011 | Makartchouk et al. | |
| 2013/0228231 A1* | 9/2013 | Nagel et al. | 137/334 |
| 2014/0054394 A1* | 2/2014 | Bugos et al. | 239/132.3 |

FOREIGN PATENT DOCUMENTS

| | | | | |
|---|---|---|---|---|
| JP | 2012137021 A | * | 7/2012 | ............... F01P 3/12 |
| KR | 10-2012-0064341 | | 6/2012 | |

* cited by examiner

*Primary Examiner* — Audrey K Bradley
(74) *Attorney, Agent, or Firm* — Harness, Dickey & Pierce, P.L.C.

(57) ABSTRACT

An exhaust after-treatment system for treating an exhaust produced by an engine. The exhaust after-treatment system may include an exhaust passageway in communication with the engine, and an exhaust treatment component provided in the exhaust passageway. A dosing module for dispensing an exhaust treatment fluid into the exhaust passageway can be located between the engine and the exhaust treatment component. A coolant source and a modular liquid-cooled mount for supporting and cooling the dosing module is also provided. The liquid-cooled mount communicates with the coolant source and includes an inlet sub-mount including a first coolant passageway, a base sub-mount including a second coolant passageway, and at least one intermediate mount disposed between the inlet sub-mount and the base sub-mount that includes a third coolant passageway, wherein each of the first, second, and third coolant passageways are in communication with each other.

22 Claims, 6 Drawing Sheets

MULTI-LAYER LIQUID-COOLED MOUNT

FIELD

The present disclosure relates to a multi-layered liquid-cooled mount for a dosing module.

BACKGROUND

This section provides background information related to the present disclosure which is not necessarily prior art.

Exhaust after-treatment systems can dose an exhaust treatment fluid into an exhaust stream to assist in removing various constituents from the exhaust. The dosing is generally done by a dosing module that is attached to an exhaust passage. The dosing module, therefore, can be indirectly exposed to temperatures that can be in excess of 400 degrees C.

To cool the dosing module as it is exposed to these temperatures, the exhaust treatment fluid can be cycled through the dosing module, or the dosing module can be provided with a cooling jacket. In the event of a shutdown of the engine producing the exhaust, no exhaust treatment fluid or cooling fluid may be cycled through the dosing module to cool it. In particular, during an emergency shutdown where all power is cut to the engine and the exhaust system, no power is available to cycle the exhaust treatment fluid or coolant through the dosing module. Without these cooling features, the dosing module can be damaged.

SUMMARY

This section provides a general summary of the disclosure, and is not a comprehensive disclosure of its full scope or all of its features.

The present disclosure provides an exhaust after-treatment system for treating an exhaust produced by an engine. The exhaust after-treatment system may include an exhaust passageway in communication with the engine, and an exhaust treatment component provided in the exhaust passageway. A dosing module for dispensing an exhaust treatment fluid into the exhaust passageway can be located between the engine and the exhaust treatment component. A coolant source and a modular liquid-cooled mount for supporting and cooling the dosing module is also provided. The liquid-cooled mount communicates with the coolant source and includes an inlet sub-mount including a first coolant passageway, a base sub-mount including a second coolant passageway, and at least one intermediate mount disposed between the inlet sub-mount and the base sub-mount that includes a third coolant passageway, wherein each of the first, second, and third coolant passageways are in communication with each other.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
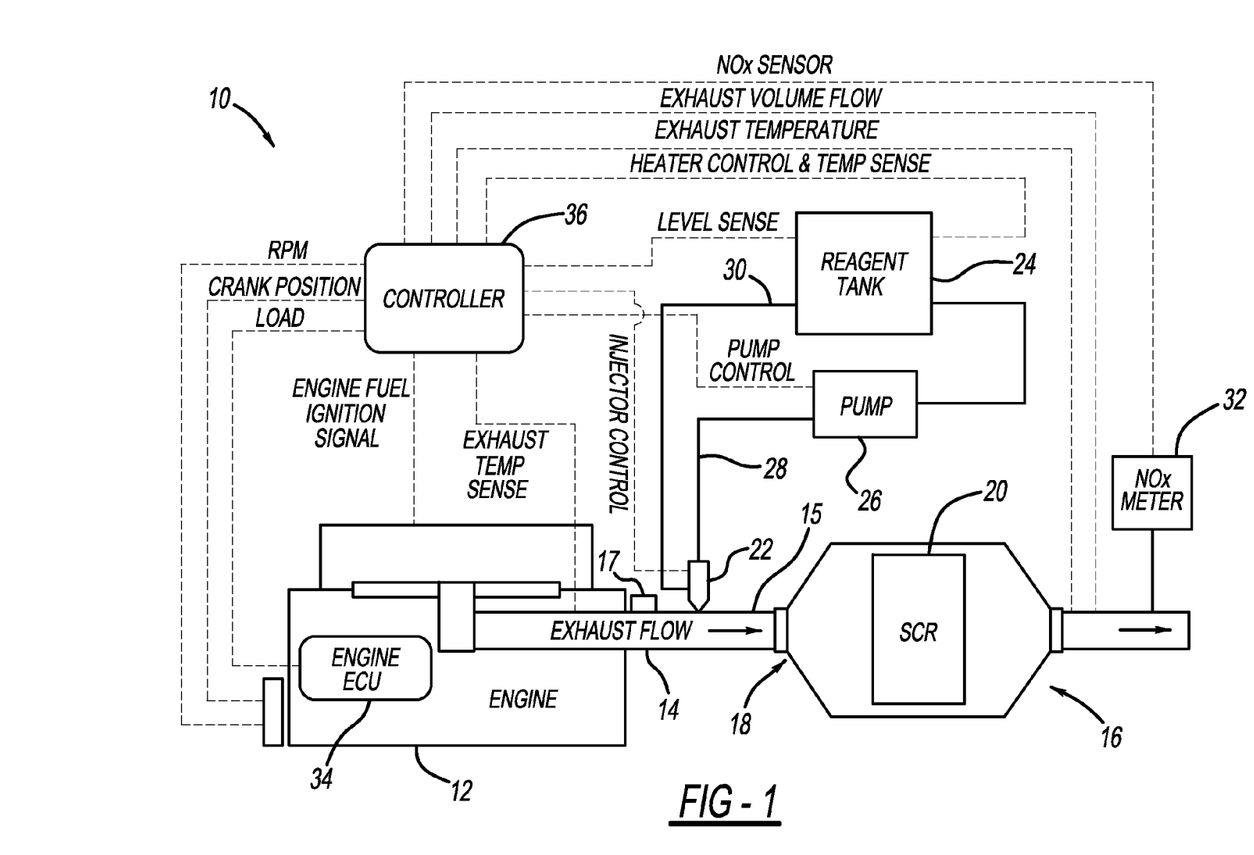
FIG. 1 is a schematic representation of an exhaust system according to a principle of the present disclosure.

FIG. 1 schematically illustrates an exhaust system 10 according to the present disclosure. Exhaust system 10 can include at least an engine 12 in communication with a fuel source (not shown) that, once consumed, will produce exhaust gases that are discharged into an exhaust passage 14 having an exhaust after-treatment system 16. Downstream from engine 12 can be disposed an exhaust treatment component 18, which can be a DOC, a DPF component, or, as illustrated, a SCR component 20. Although not required by the present disclosure, exhaust after-treatment system 16 can further include components such as a thermal enhancement device or burner 17 to increase a temperature of the exhaust gases passing through exhaust passage 14. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment component 18 is a DPF.

To assist in reduction of the emissions produced by engine 12, exhaust after-treatment system 16 can include a dosing module 22 for periodically dosing an exhaust treatment fluid into the exhaust stream. As illustrated in FIG. 1, dosing module 22 can be located upstream of exhaust treatment component 18, and is operable to inject an exhaust treatment fluid into the exhaust stream. In this regard, dosing module 22 is in fluid communication with a reagent tank 24 and a pump 26 by way of inlet line 28 to dose an exhaust treatment fluid such as diesel fuel or urea into the exhaust passage 24 upstream of exhaust treatment component 20. Dosing module 22 can also be in communication with reagent tank 24 via return line 30. Return line 30 allows for any exhaust treatment fluid not dosed into the exhaust stream to be returned to reagent tank 24. Flow of the exhaust treatment fluid through inlet line 28, dosing module 22, and return line 30 also assists in cooling dosing module 22 so that dosing module 22 does not overheat.

The amount of exhaust treatment fluid required to effectively treat the exhaust stream may vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 32 may be positioned downstream from SCR 20. $NO_x$ sensor 32 is operable to output a signal indicative of the exhaust $NO_x$ content to an engine electronic control unit (ECU) 34. All or some of the engine operating parameters may be supplied from ECU 34 via the engine/vehicle databus to exhaust after-treatment system controller 36. The controller 36 could also be included as part of the ECU 34. Exhaust gas temperature, exhaust gas flow and exhaust back pressure and other vehicle operating parameters may be measured by respective sensors, as indicated in FIG. 1.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 22. Accordingly, although only a single dosing module 22 is illustrated for urea dosing, it should be understood that multiple dosing modules 22 for urea injection are contemplated by the present disclosure.

As noted above, flow of the exhaust treatment fluid through inlet line 28, dosing module 22, and return line 30 also assists in cooling dosing module 22 so that dosing module 22 does not overheat. The present disclosure provides a liquid-cooled mount 38 that further assists in cooling dosing module 22 during use thereof. Dosing module 22 is generally mounted directly to exhaust passage 14. Dosing module 22, therefore, is indirectly exposed to temperatures that can be in excess of 400 degrees C. in exhaust passage 14 through a wall 15 of exhaust passage 14. In the event of a shutdown of engine 12, in particular an emergency shutdown where all power is cut to engine and exhaust system 16, no exhaust treatment fluid may be cycled through dosing module 22, which can damage dosing module 22.

Figure 2:
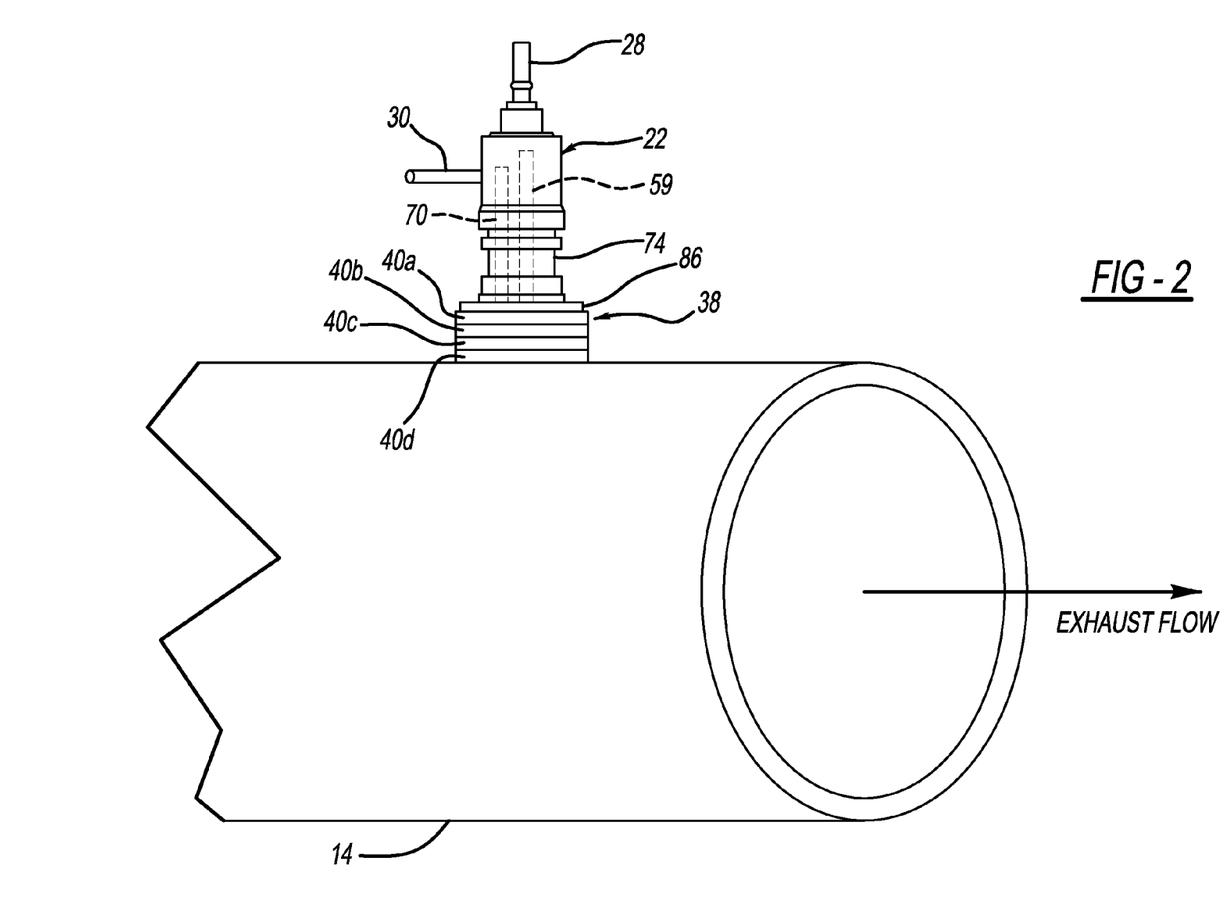
FIG. 2 is a perspective view of a dosing module and liquid-cooled mount secured to an exhaust conduit according to a principle of the present disclosure.
Figure 3:
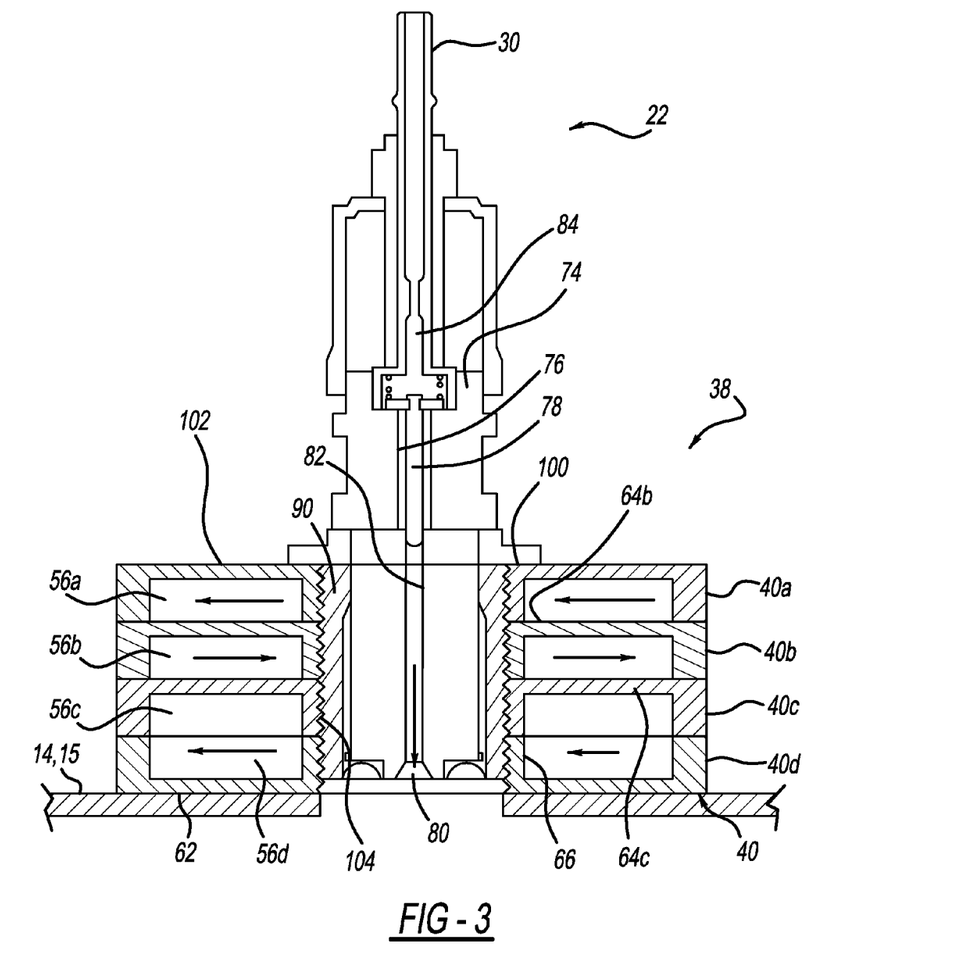
FIG. 3 is a cross-sectional view of a modular liquid-cooled mount according to a principle of the present disclosure.

Now referring to FIGS. 2-8, liquid-cooled mount 38 will now be described in more detail. As best shown in FIGS. 2 and 3, liquid-cooled mount 38 can be configured modularly from a plurality of sub-mounts 40. The modular design of liquid-cooled mount 38 allows for tailored cooling of dosing module 22. For example, if dosing module 22 is located immediately downstream from thermal enhancement device 17, exhaust temperatures in exhaust passage 14 can be higher than exhaust temperatures at locations further downstream from thermal enhancement device 17. Accordingly, a dosing module 22 located immediately downstream from thermal enhancement device 17 may include a greater number of sub-mounts 40 in comparison to a dosing module 22 that is subjected to lower exhaust temperatures.

In the illustrated embodiment, liquid-cooled mount 38 includes four sub-mounts 40, including an inlet mount 40a, a first intermediate mount 40b, a second intermediate mount 40c, and a base mount 40d. It should be understood, however, that mount 38 may comprise inlet mount 40a alone or in combination with base mount 40d to cool dosing module 22 in accordance with the present disclosure.

Although each sub-mount 40a-40d is illustrated as being cylindrical in shape, it should be understood that any shape can be used for sub-mounts 40a-40d so long as coolant may easily flow between each sub-mount 40a-40d as will be described in more detail below. Each sub-mount 40a-40d may be stamped from materials such as steel, aluminum, powdered metals, and the like, without limitation so long as the materials are able to withstand exposure to the coolant liquid, which can be glycol-based coolants or any other type of engine coolant known to one skilled in the art. Each sub-mount 40a-40d can be secured to each other via welding, brazing, or any other connection method known to one skilled in the art.

Each sub-mount 40a-40d includes a central aperture 50a-50d in receipt of dosing module 22. Central apertures 50a-50d for each sub-mount 40a-40d are defined by cylindrical central walls 52a-52d disposed radially inward from a cylindrical outer wall 54a-54d. A coolant flow path 56a-56d is defined by an annular surface 67a-67d positioned between central wall 52a-52d and outer wall 54a-54d of each sub-mount 40a-40d. Coolant flow paths 56a-56d of each sub-mount 40a-40d are in communication with each other, as will be described in more detail below. The amount of coolant housed within mount 38 at any one time can be tailored to meet the heat transfer requirements for a particular dosing module installation.

Figure 4:
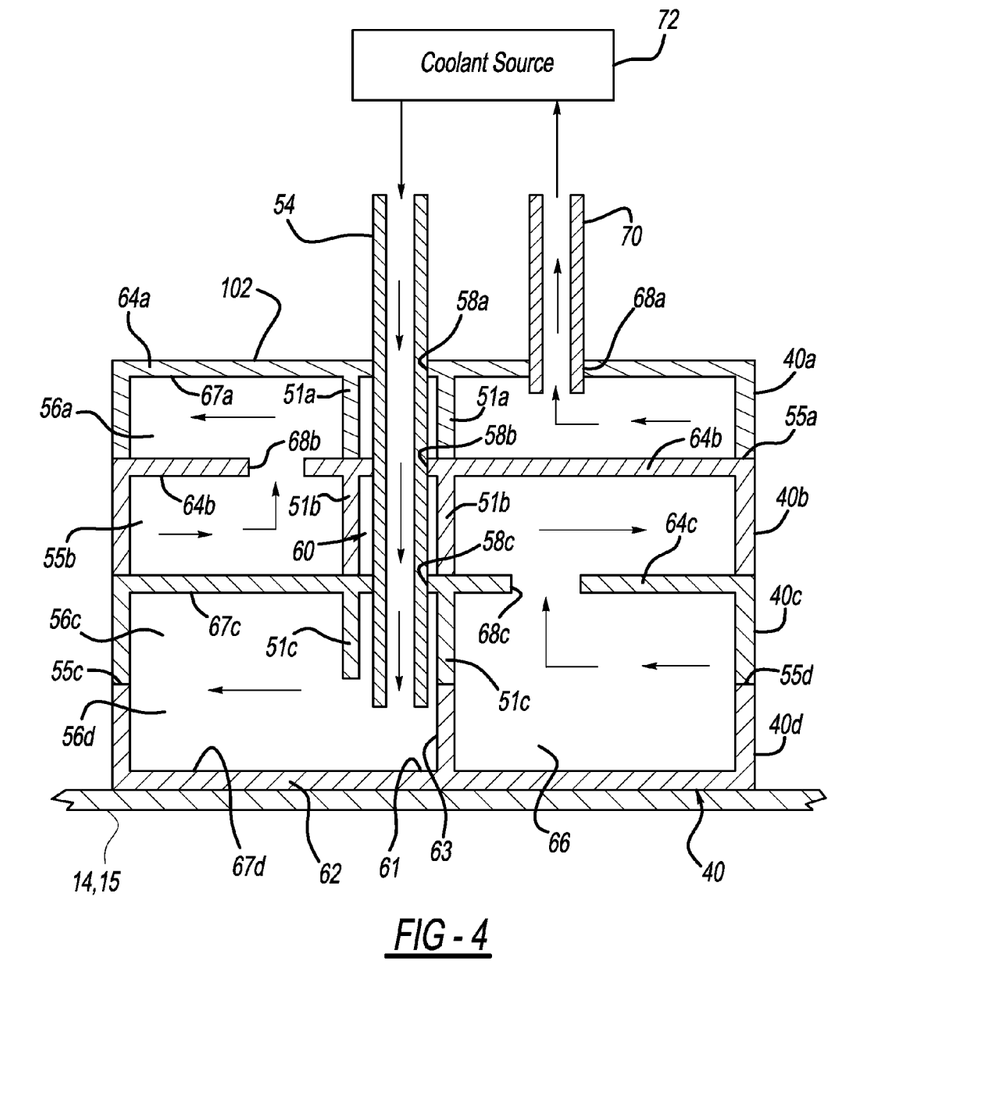
FIG. 4 is another cross-sectional view of the modular liquid-cooled mount illustrated in FIG. 3.
Figure 5:
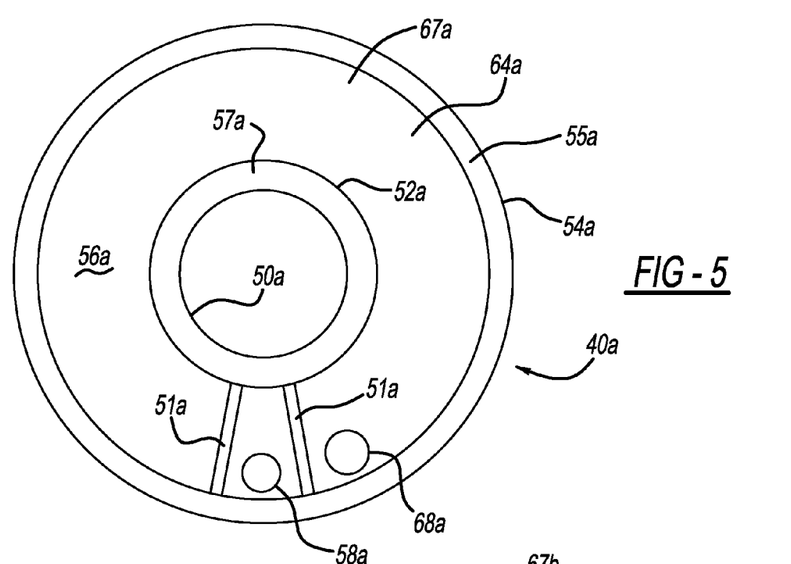
FIGS. 5-8 are bottom perspective views of sub-mounts used to form the modular liquid-cooled mount illustrated in FIGS. 2-4.
Figure 6:
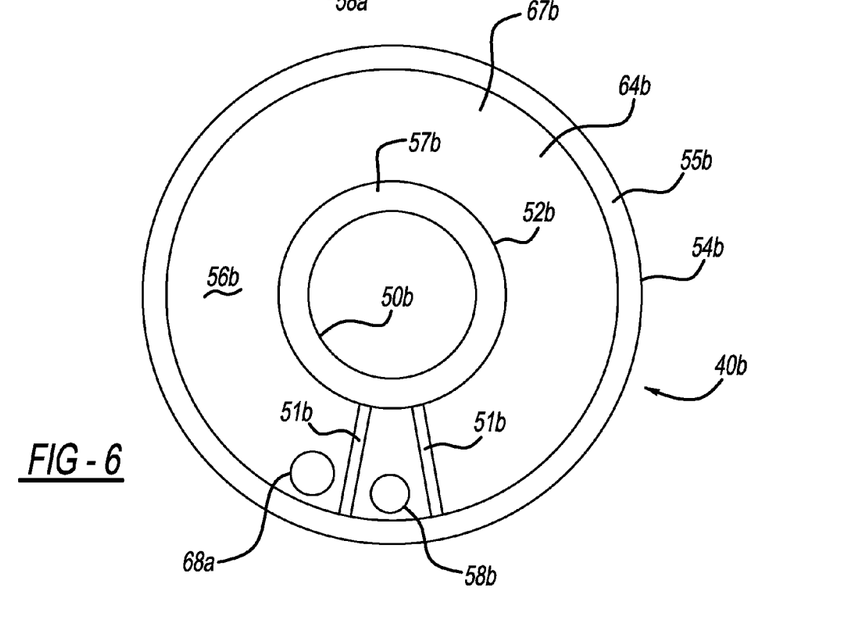
Figure 7:
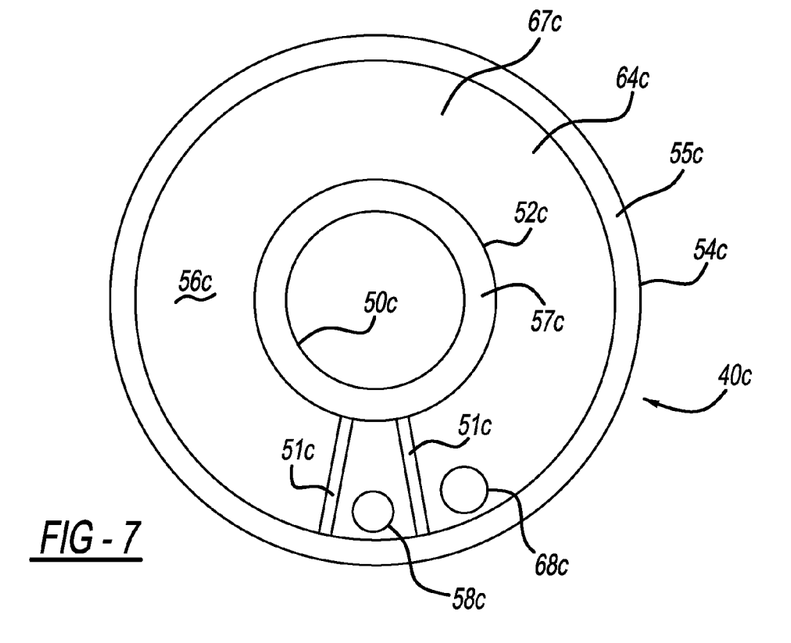
Figure 8:
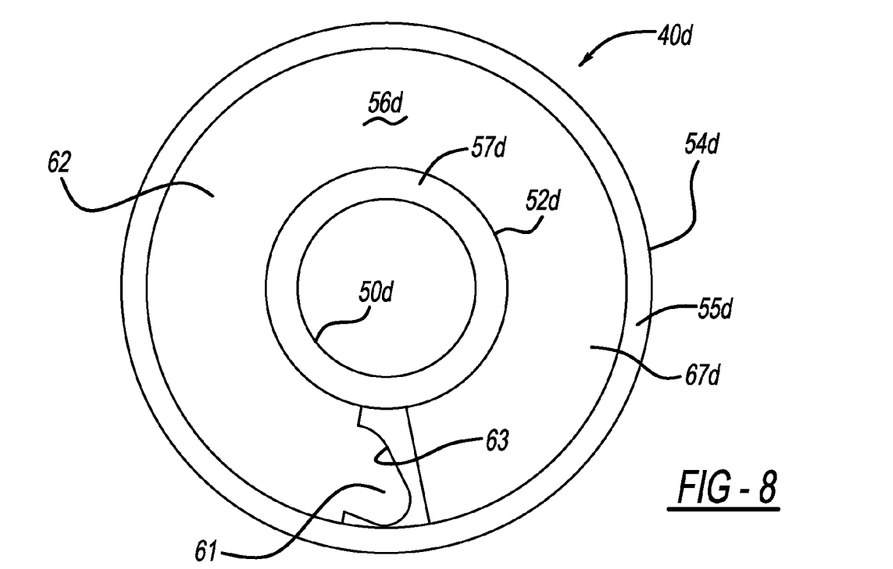

Before describing flow of coolant through mount 38, the features of each sub-mount 40a-40d will be described. Inlet mount 40a, first intermediate sub-mount 40b, and second intermediate mounts 40c each include an inlet port 58a-58c that are co-axially aligned to form an inlet passage 60 (FIG. 4). Inlet ports 58a-58c are fluidly isolated from flow paths 56a-56c by walls 51a-51c positioned between central walls 52a-52c and outer walls 54a-54c. Base sub-mount 40d includes a basin 61 positioned adjacent to a curved wall 63 that interconnects central wall 52d and outer wall 54d.

Inlet passage 60 terminates at basin 61 to supply coolant to base sub-mount 40d before circulating through mount 38. Inlet port 58a is in communication with an inlet tube 59 to place mount 38 in fluid communication with coolant source 72. Although inlet tube 59 is shown as being positioned in each inlet port 58a-58c, it should be understood that inlet tube 59 can be positioned in only inlet port 58a without departing from the scope of the present disclosure.

Base sub-mount 40d includes a base member 62 that defines annular surface 67d between outer walls 54d and central walls 52d. Second immediate mount 40c includes an upper member 64c that defines annular surface 67c that faces annular surface 67d of base sub-mount 40d. Outer walls 54c and 54d include terminal ends 55c and 55d, respectively, that abut and are fixed together, while central walls 52c and 52d include terminal ends 57c and 57d that abut and are fixed together (FIGS. 5-8). Because annular surfaces 67c and 67d face each, the resultant flow paths 56d and 56c of each of base sub-mount 40d and second intermediate sub-mount 40c provide a larger flow path 66 for the coolant in comparison to the flow paths 56b and 56a of first intermediate sub-mount 40b and inlet sub-mount 40a.

Similar to second intermediate sub-mount 40c, first intermediate sub-mount 40b includes an upper member 64b that defines annular surface 67b between outer wall 54b and central wall 52b. Annular surface 67c defines the coolant pathway 56b. Outer wall 54b includes a terminal end 55b that abuts and is fixed to upper member 64c, while central wall 52b includes a terminal end 57b that abuts and is fixed to upper member 64c.

Inlet sub-mount 40a includes an upper member 64a that defines annular surface 67a positioned between outer wall 54a and central wall 52a. Annular surface 67a defines a coolant pathway 56a. Outer wall 54a includes a terminal end 55a that abuts and is fixed to upper member 64b, while central wall 52a includes a terminal end 57a that abuts and is fixed to upper member 64b.

As noted above, inlet ports 58a-58c are co-axially aligned to define inlet passage 60 that terminate at basin 61. Coolant from coolant source 72 flows down inlet passage 60 and enters basin 61. Due to curved wall 63 at base sub-mount 40d, coolant will tend to flow in the passageways 56d and 56c between base sub-mount 40d and second intermediate sub-mount 40c in a clockwise manner until the coolant reaches an outlet port 68c formed in second intermediate sub-mount 40c. Coolant may then exit passageways 56d and 56c through outlet port 68c and enter the coolant passageway 56b of first intermediate sub-mount 40b.

Once the coolant enters first intermediate sub-mount 40b, the coolant will tend to flow in a counter-clockwise direction until it reaches outlet port 68b formed in first intermediate sub-mount 40*b*. The coolant will then exit flow path 56*b* through outlet port 68*b* and enter the coolant passageway 56*a* of inlet sub-mount 40*a*.

Once the coolant enters inlet sub-mount 40*a*, the coolant will flow in a clockwise direction until it reaches outlet port 68*a* that communicates with an outlet tube 70. The coolant will then exit flow path 56*a* through outlet port 68*a* and enter outlet tube 70 where the coolant will then be communicated back to coolant source 72. Coolant source 72 may be the same coolant source as that used by engine 12.

In contrast to the co-axially aligned inlet ports 58*a*-58*c*, outlet ports 68*a*-68*c* are staggered when sub-mounts 40*a*-40*c* are stacked on one another. The staggering of outlet ports 68*a*-68*c* allows for a meandering flow path between each sub-mount 40*a*-40*c* that allows for the coolant to flow in the clockwise and counter-clockwise directions. This creates a turbulent flow in mount 38, which assists in cooling dosing module 22.

Dosing module 22 may include a dosing module body 74. Dosing module body 74 defines a cylindrical chamber 76 that receives an axially translatable valve member 78. The dosing module body 74 includes an exit orifice 80 at a discharge location for the dosed reagent. A valve seat 82 is formed proximate the exit orifice 80. The valve seat 82 is selectively engaged by the valve member 78 to control reagent dosing into the exhaust gas flow path defined by conduit 14. The valve member 78 is translatable along an axis of reagent injection 84.

An adapter 86 is fixed to the dosing module body 74 and includes a radially outwardly extending flange 88 and a cylindrical male extension portion 90. The cylindrical male extension portion 90 can define an outer diameter 92 having outer threads 94 and can extend to a terminal end 96. The outwardly extending flange 88 can define an outer diameter 98 and includes a dosing module flange face 100. The outer diameter 98 of the outwardly extending flange 88 is larger than the outer diameter 92 of the cylindrical male extension portion 90 such that flange face 100 overlaps an upper surface 102 of upper member 64*a*. When fully assembled, cooling mount 38 defines a threading 104 that engages with threading 94 of cylindrical male extension portion 86 to secure dosing module 22 to cooling mount 38.

According to the above, liquid-cooled mount 38 provides a lengthened coolant passageway that assists in cooling a dosing module 22. Due to the increased length of the coolant passageway, in the event of an engine 12 shutdown, a larger amount of coolant can remain in liquid-cooled mount 38 to assist in cooling dosing module 22 as the temperature of exhaust system 16 abates. Further, because liquid-cooled mount 38 is modular, the number of sub-mounts 40 used to configure liquid-cooled mount 38 can be varied according to the amount of heat that each individual dosing module 22 is exposed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A modular mount for a dosing module that is operable to dose an exhaust treatment fluid into an exhaust stream, the mount comprising:
    an inlet sub-mount including a first coolant passageway;
    a base sub-mount including a second coolant passageway; and
    at least one intermediate mount disposed between the inlet sub-mount and the base sub-mount, the at least one intermediate sub-mount including a third passageway, wherein each of the first, second, and third coolant passageways are in communication with each other, wherein each sub-mount includes a centrally-disposed aperture defined by a central wall for receipt of the dosing module operable to dose the exhaust treatment fluid into the exhaust stream.

2. The modular mount of claim 1, wherein each sub-mount includes an outer wall extending perpendicular to a base, and the coolant passageway of each sub-mount is at least partially defined between the central wall, the base and the outer wall.

3. A modular mount for a dosing module that is operable to dose an exhaust treatment fluid into an exhaust stream, the mount comprising:
    an inlet sub-mount including a first coolant passageway;
    a base sub-mount including a second coolant passageway; and
    at least one intermediate mount disposed between the inlet sub-mount and the base sub-mount, the at least one intermediate sub-mount including a third passageway, wherein each of the first, second, and third coolant passageways are in communication with each other and shaped to at least partially circumferentially extend about the dosing module,
    wherein the dosing module extends through each of the inlet, intermediate, and base sub-mounts.

4. The modular mount of claim 3, wherein each sub-mount is a stamped member.

5. The modular mount of claim 3, wherein the inlet and intermediate sub-mounts include co-axially aligned inlet ports in communication with a coolant source.

6. The modular mount of claim 5, wherein each sub-mount includes an outlet port that communicates with either the coolant source or an adjacent sub-mount.

7. The modular mount of claim 6, wherein the outlet ports are staggered when viewed in plan.

8. A modular mount for a dosing module that is operable to dose an exhaust treatment fluid into an exhaust system, the mount comprising:
    an inlet sub-mount including a first channel;
    a base sub-mount including a second channel; and
    at least one intermediate sub-mount disposed between the inlet sub-mount and the base sub-mount, the at least one intermediate sub-mount including a third channel,
    wherein a portion of the intermediate sub-mount and the first channel at least partially defines a circumferentially extending first coolant passageway, the second channel and a portion of the intermediate sub-mount at least partially defining a second circumferentially extending coolant passageway in communication with the first coolant passageway,
    wherein the dosing module extends through each of the inlet, intermediate, and base sub-mounts.

9. The modular mount of claim 8, wherein the first and second channels open in opposite directions.

10. The modular mount of claim 8, wherein the first channel terminates at a radially extending wall.

11. The modular mount of claim 10, wherein the inlet sub-mount includes an inlet port and an outlet port each in communication with the first channel and positioned on opposite sides of the radially extending wall.

12. An exhaust after-treatment system for treating an exhaust produced by an engine, comprising:
   an exhaust passageway in communication with the engine;
   an exhaust treatment component provided in the exhaust passageway;
   a dosing module for dispensing an exhaust treatment fluid into the exhaust passageway, the dosing module being located between the engine and the exhaust treatment component;
   a coolant source; and
   a modular liquid-cooled mount for supporting and cooling the dosing module, the liquid-cooled mount in communication with the coolant source and including:
      an inlet sub-mount including a first coolant passageway;
      a base sub-mount including a second coolant passageway; and
      at least one intermediate mount disposed between the inlet sub-mount and the base sub-mount, the at least one intermediate sub-mount including a third passageway, wherein each of the inlet, intermediate, and base sub-mounts is cup-shaped including a base, a central wall and an outer wall, the coolant passageways extending between the central wall and the outer wall,
   wherein each of the first, second, and third coolant passageways are in communication with each other.

13. The exhaust after-treatment system of claim 12, wherein the inlet-sub-mount includes an inlet tube and an outlet tube in communication with the coolant source.

14. The exhaust after-treatment system of claim 12, wherein each of the inlet, intermediate, and base sub-mounts include a centrally-disposed aperture operable to allow the exhaust treatment fluid to communicate between the exhaust passage and the dosing module.

15. The exhaust after-treatment system of claim 12, wherein each of the inlet, intermediate, and base sub-mounts are a stamped member.

16. The exhaust after-treatment system of claim 12, wherein the dosing module extends through each of the inlet, intermediate, and base sub-mounts.

17. The exhaust after-treatment system of claim 12, wherein the exhaust treatment fluid is urea.

18. The exhaust after-treatment system of claim 12, wherein flow of the coolant in the inlet sub-mount occurs in a clockwise direction, and flow of the coolant in the intermediate sub-mount occurs in a counter-clockwise direction.

19. The exhaust after-treatment system of claim 12, wherein each of the inlet sub-mount and intermediate sub-mounts include an inlet port and an outlet port.

20. The exhaust after-treatment system of claim 19, wherein the inlet ports are axially aligned to define an inlet passage that terminates at the base sub-mount.

21. The exhaust after-treatment system of claim 19, wherein the outlet ports are axially staggered.

22. An exhaust after-treatment system for treating an exhaust produced by an engine, comprising:
   an exhaust passageway in communication with the engine;
   an exhaust treatment component provided in the exhaust passageway;
   a dosing module for dispensing an exhaust treatment fluid into the exhaust passageway, the dosing module being located between the engine and the exhaust treatment component;
   a coolant source; and
   a modular liquid-cooled mount for supporting and cooling the dosing module, the liquid-cooled mount in communication with the coolant source and including:
      an inlet sub-mount including a first coolant passageway;
      a base sub-mount including a second coolant passageway; and
      at least one intermediate mount disposed between the inlet sub-mount and the base sub-mount, the at least one intermediate sub-mount including a third passageway, wherein each of the first, second, and third coolant passageways are in communication with each other, wherein the third coolant passageway of the intermediate sub-mount and the second coolant passageway of the base sub-mount face each other to define a coolant passageway having a larger cross-sectional area than each of the first, second, and third coolant passageways.

* * * * *